United States Patent [19]
Iga

[11] Patent Number: 5,941,355
[45] Date of Patent: Aug. 24, 1999

[54] ONE-WAY CLUTCH

[75] Inventor: Kazuo Iga, Yamatotakada, Japan

[73] Assignee: Koyo Seiko Co., Ltd., Osaka, Japan

[21] Appl. No.: 08/997,000

[22] Filed: Dec. 23, 1997

[30] Foreign Application Priority Data

Dec. 25, 1996 [JP] Japan .................................. 8-345047

[51] Int. Cl.$^6$ .............................................. F16D 41/067
[52] U.S. Cl. ........................................................ 192/45
[58] Field of Search ................................................ 192/45

[56] References Cited

U.S. PATENT DOCUMENTS

| | | | |
|---|---|---|---|
| 3,537,554 | 11/1970 | Elmore et al. | 192/45 |
| 3,537,555 | 11/1970 | Reister et al. | 192/45 |
| 3,937,312 | 2/1976 | Gehrke | 192/45 |
| 3,955,659 | 5/1976 | Ehret et al. | 192/45 |
| 4,878,569 | 11/1989 | Schaffler | 192/45 |
| 5,511,642 | 4/1996 | Klotz et al. | 192/45 |
| 5,695,031 | 12/1997 | Kurita et al. | 192/45 |

FOREIGN PATENT DOCUMENTS

| | | |
|---|---|---|
| 6-43369 | 6/1994 | Japan . |
| 7-29316 | 7/1995 | Japan . |

*Primary Examiner*—Rodney H. Bonck
*Attorney, Agent, or Firm*—Thelen Reid & Priest LLP

[57] ABSTRACT

The present invention is intended to provide a one-way clutch provided with a retainer which requires no crimping work in spite of using a metal spring and is superior in reliability and durability.

In order to attain the object, the retainer is equipped with one ring-shaped portion having an outer circumferential surface to be fitted into the inner circumferential surface of an outer race, and the other ring-shaped portion having an outer diameter smaller than that of the one ring-shaped portion and having convex portions formed at constant intervals in the circumferential direction on the outer circumferential surface thereof, these two ring-shaped portions being connected with bar portions so as to form pockets each accommodating a roller between every two of the bar portions. A metal spring, which is equipped with a flange portion having concave portions on the inner circumferential side to be fitted over the convex portions formed on the retainer, leaf portions positioned in the pockets of the retainer, and convex portions having inner circumferential surfaces to be fitted over the outer circumferential surfaces of the bar portions, is fitted into the retainer.

1 Claim, 5 Drawing Sheets

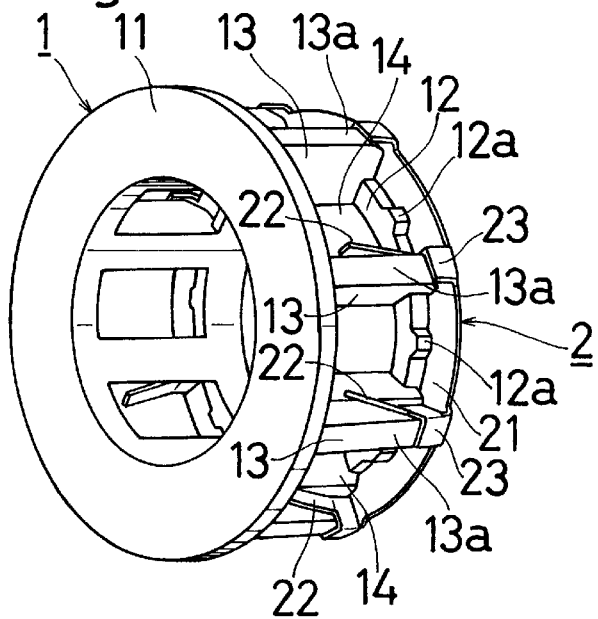
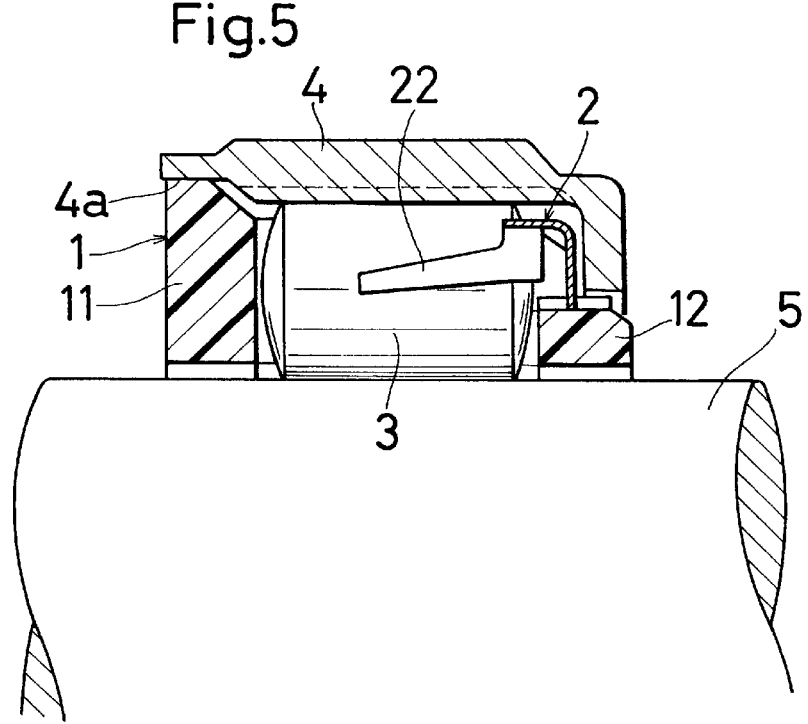

ONE-WAY CLUTCH

BACKGROUND OF THE INVENTION

The present invention relates to a one-way clutch for transferring rotation torque in only one direction, more particularly to a one-way clutch provided with a retainer which requires no crimping work and is equipped with a durable metal spring.

In a one-way clutch having a shell-type outer race, a retainer is fitted into an outer race having a cam surface on its inner circumferential surface, and an inner race or a rotation shaft is fitted into the inner hole of the retainer during assembly. In this case, rollers are disposed in the pockets of the retainer, and springs are usually provided in the pockets of the retainer to push the rollers in the circumferential direction.

As a spring for use in the above-mentioned retainer, a metal spring 32 having a leaf 32a is formed separately as shown in FIG. 7B, and the main body portion of the metal spring 32 is crimped onto the bar portion 31a of a retainer 31 as shown in FIG. 7A. Alternatively, as shown in FIG. 6, a V-shaped leaf 33b is formed on one side of a bar portion 33a in the pocket 33c of a retainer 33 to push a roller (not shown) disposed in the pocket 33c in one direction.

As described above, in the retainer of the conventional one-way clutch, the spring for pushing the roller is either a separate type wherein the metal spring 32 is crimped onto the bar portion 31a of the retainer 31 or an integrated type wherein the leaf 33b is integrated with the bar portion 33a of the retainer 33. However, in the one-way clutch comprising the metal springs 32 crimped one by one onto the retainer 31, much time and labor are taken during assembly, and a special skill is required to pressure-fit the retainer into the inner circumferential surface of the outer race, whereby assembly cost cannot be reduced.

In addition, in the integrated type one-way clutch wherein the spring 33b is formed on the retainer 33 as shown in FIG. 6, since the retainer 33 is usually formed of a synthetic resin, the spring 33b itself is low in durability. Furthermore, the metal mold for producing the retainer is complicated, inferior in durability and reliability and high in cost.

SUMMARY OF THE INVENTION

Accordingly, an object of the present invention is to provide a one-way clutch provided with a retainer which requires no crimping work in spite of using a metal spring and is superior in reliability and durability.

In other words, in order to solve the above-mentioned problems, the present invention is intended to provide a one-way clutch comprising a retainer provided with one ring-shaped portion having an outer circumferential surface to be fitted into the inner circumferential surface of an outer race, the other ring-shaped portion having an outer diameter smaller than that of the one ring-shaped portion and having convex portions formed at constant intervals in the circumferential direction on the outer circumferential surface thereof, bar portions for connecting the two ring-shaped portions, and pockets for each accommodating a roller between every two of the bar portions; and a metal spring provided with a flange portion having concave portions on the inner circumferential side thereof to be fitted over the convex portions formed on the outer circumferential surface of the other ring-shaped portion, elastic leaf portions formed at constant intervals in the circumferential direction on the outer circumferential side of the flange portion, extended in the axial direction and positioned in the pockets of the retainer, and convex portions formed at constant intervals in the circumferential direction on the outer circumferential side of the flange portion, extended in the axial direction, and having inner circumferential surfaces to be fitted over the outer circumferential surfaces of the bar portions.

BRIEF DESCRIPTION OF THE DRAWINGS

FIG. 4 is an overall perspective view showing a metal spring having been mounted on the retainer for use in the one-way clutch in accordance with the present invention, taken from the side opposite to the side in FIG. 3;

FIG. 5 is an axial sectional view showing the one-way clutch in accordance with the present invention;

DETAILED DESCRIPTION OF THE PREFERRED EMBODIMENTS

Figure 1A:
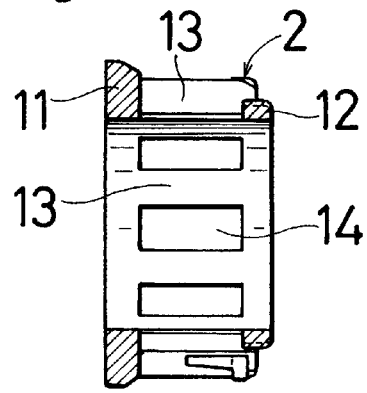
FIG. 1A is an axial sectional view showing a retainer for use in a one-way clutch in accordance with the present invention.

Embodiments in accordance with the present invention will be described below referring to the drawings.

Figure 1B:
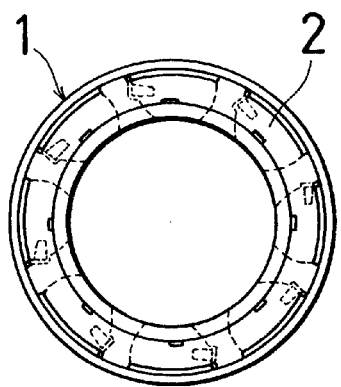
FIG. 1B is a right side view showing the retainer shown in FIG. 1A.
Figure 1C:
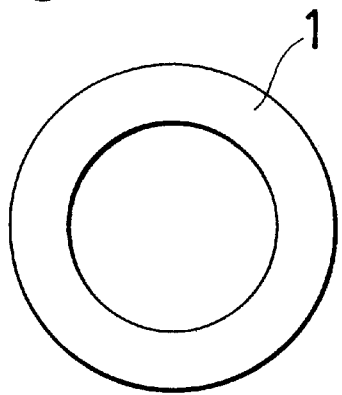
FIG. 1C is a left side view showing the retainer shown in FIG. 1A.

FIG. 1A is an axial sectional view showing a retainer 1 for use in the one-way clutch of the present invention incorporating a ring-shaped metal spring 2; FIG. 1B is a right side view showing the retainer 1 shown in FIG. 1A; FIG. 1C is a left side view showing the retainer 1 shown in FIG. 1A. The retainer 1 is formed of a synthetic resin by injection molding, and a ring-shaped metal spring 2 is fitted into the retainer 1 as further detailed below.

Figure 2:
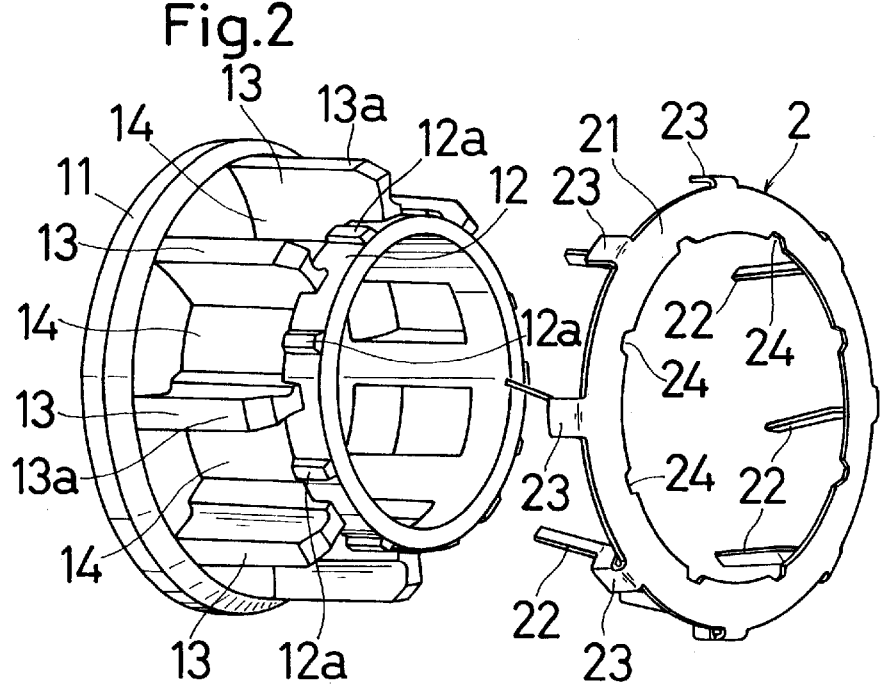
FIG. 2 is an overall perspective view showing a metal spring to be mounted on the retainer for use in the one-way clutch in accordance with the present invention.
Figure 3:
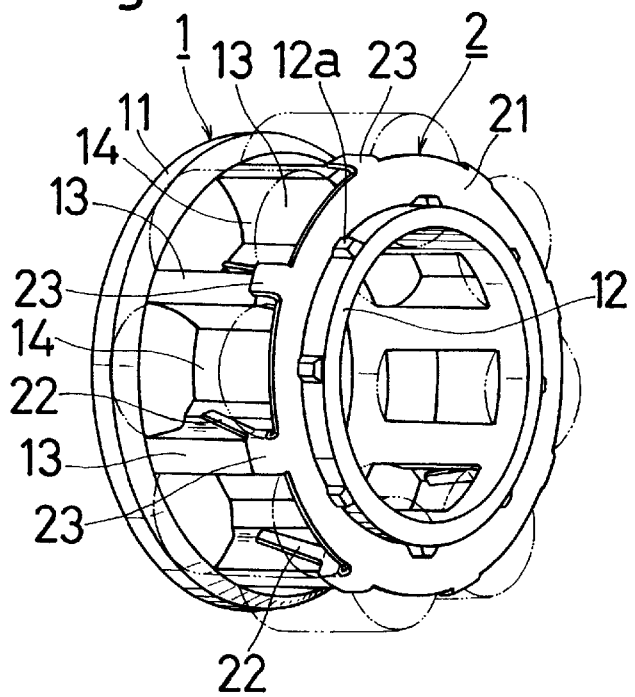
FIG. 3 is an overall perspective view showing a metal spring having been mounted on the retainer for use in the one-way clutch in accordance with the present invention.
Figure 6:
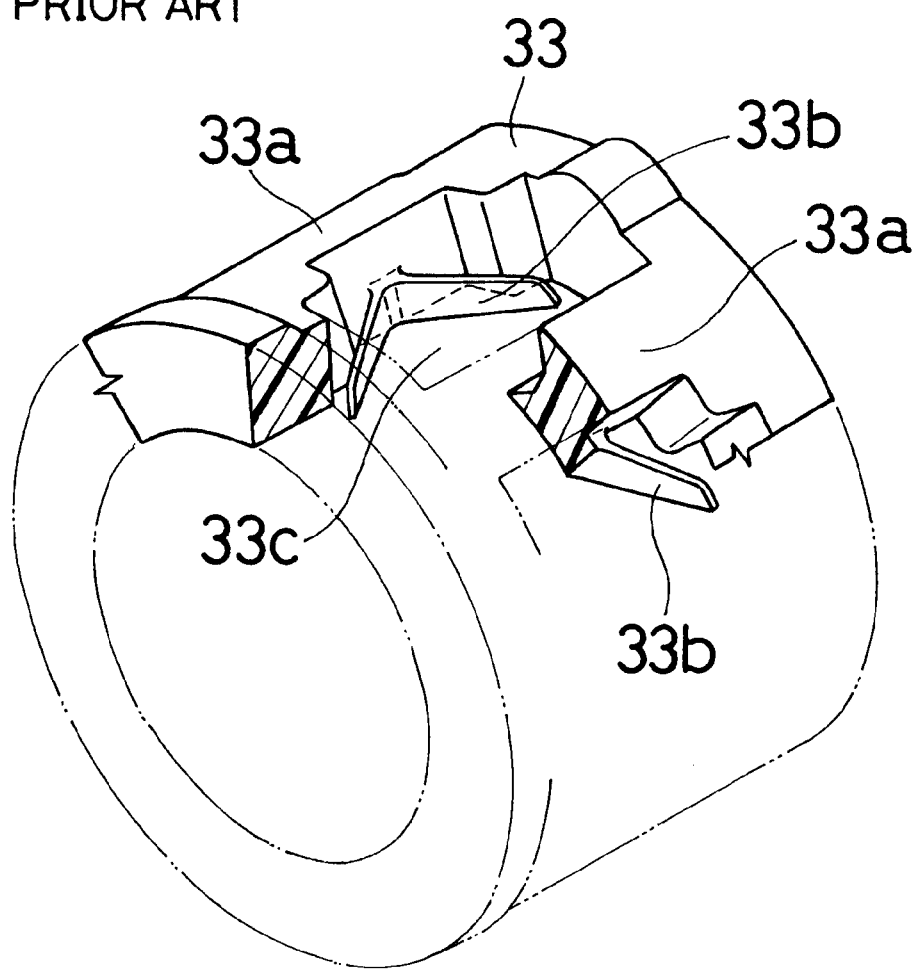
FIG. 6 is a perspective view showing a retainer formed of a synthetic resin and integrated with leaves and for use in a conventional one-way clutch.
Figure 7A:
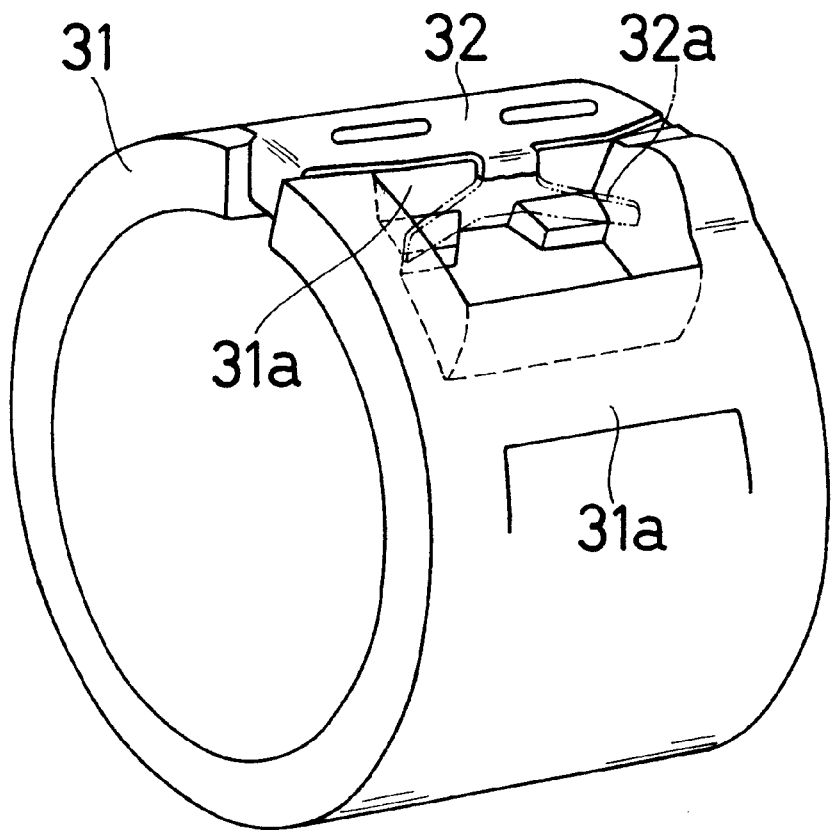
FIG. 7A is a perspective view showing a retainer having metal leaves crimped thereon and for use in a conventional one-way clutch.
Figure 7B:
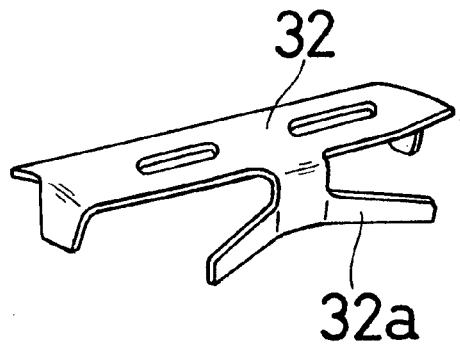
FIG. 7B is a perspective view showing a metal spring to be built into the retainer.

FIG. 2 is an overall perspective view showing the ring-shaped metal spring 2 to be mounted on the retainer 1; FIG. 3 is an overall perspective view showing the metal spring 2 having been mounted on the retainer 1; FIG. 4 is an overall perspective view showing the metal spring 2 having been mounted on the retainer 1, taken from the side opposite to the side in FIG. 3.

The retainer 1 comprises a ring-shaped portion 11, a ring-shaped portion 12 having an outer diameter smaller than that of the ring-shaped portion 11, bar portions 13 for connecting the two ring-shaped portions, and pockets 14, 14, . . . for each accommodating a roller 3 between every two of the bar portions 13, 13. The outer diameter of the ring-shaped portion 11 has a dimension suited for pressure fitting into the inner circumferential surface 4a (see FIG. 5) of an outer race 4. In addition, the inner circumferential surfaces of convex portions 23 described later and formed on the metal spring 2 are fitted over the outer circumferential surfaces 13a of the bar portions 13.

On the outer circumferential surface of the ring-shaped portion 12 of the retainer 1, convex portions 12a, 12a, are formed at constant intervals in the circumferential direction. These convex portions 12a, 12a, . . . are fit into concave portions 24, 24, . . . formed at constant intervals in the circumferential direction on the inner circumferential side of the flange portion 21 of the metal spring 2 as described later.

Next, the metal spring 2 is provided with the flange portion 21, elastic leaf portions 22 formed at constant intervals in the circumferential direction on the outer circumferential side of the flange portion 21, extended in the axial direction and slightly bent to one side, and the convex portions 23 also formed at constant intervals in the circumferential direction on the outer circumferential side of the flange portion 21 and extended in the axial direction. In other words, the metal spring 2 is a ring-shaped spring having the leaf portions 22 formed at constant intervals in the outer circumferential direction of the flange portion 21. Furthermore, on the inner circumferential side of the flange 21, the concave portions 24, 24, . . . are formed so as to accommodate the convex portions 12a, 12a, . . . formed on the outer circumferential surface of the ring-shaped portion 12 of the retainer 1. When the ring-shaped metal spring 2 is fit into the retainer 1, the convex portions 23, 23, . . . formed on the metal spring 2 are fit over the outer circumferential surfaces of the bar portions 13, and the concave portions 24 formed on the inner circumferential side of the flange portion 21 of the metal ring 2 are fitted over the convex portions 12a formed on the ring-shaped portion 12. As a result, the metal spring 2 can be firmly secured to the retainer 1, and relative rotation between the retainer 1 and the metal spring 2 fitted into the retainer 1 can be prevented.

FIG. 5 is an axial sectional view showing the one-way clutch wherein the retainer 1 is fitted into the outer race 4, and a shaft 5 is fitted into the inner hole of the retainer 1. When the metal spring 2 is fitted into the retainer 1, the elastic leaf portions 22 are positioned near the bar portions 13 inside the pockets 14 of the retainer 1. Since the leaf portions 22 are slightly bent, they have a function to push the rollers 3 disposed in the pockets in one direction. In other words, when the rollers 3 are put into the pocket 14 of the retainer 1, and fitted into the inner circumferential surface 4a of the outer race 4, the leaf portions 22 push the rollers toward the side for allowing the shaft 5 to rotate.

As described above, the one-way clutch of the present invention comprises the outer race 4 having a cam surface formed on its inner circumferential surface, the retainer 1, the ring-shaped metal spring 2 having the elastic leaf portions 22 formed on the flange portion 21, and the rollers 3. These components can be assembled simply by fitting the metal spring 2 over the ring-shaped portion 12 of the retainer 1, by disposing the rollers 3 in the pockets 14 of the retainer 1, and by fitting the assembled components into the outer race 4. After the assembly, the rollers 3 disposed in the pockets 14 of the retainer 1 are pushed by the leaf portions 22 of the metal spring 2 toward the free-rotation side at all times.

In addition, the outer diameter of the ring-shaped portion 12 of the retainer 1 is made smaller than that of the ring-shaped portion 11, and the outer diameter of the ring-shaped portion 11 has a dimension suited for pressure fitting into the inner circumferential surface 4a of the outer race 4. When these components are assembled into a one-way clutch, assembly is conducted by fitting the metal spring 2 over the ring-shaped portion 12 of the retainer 1, by disposing the rollers 3 in the pockets 14, by fitting the assembled components into the outer race 4 from the side of the ring-shaped portion 12, and by pressure-fitting the ring-shaped portion 11 into the inner circumferential surface 4a of the outer race 4 as shown in FIG. 5. Consequently, the retainer 1 provided with the metal spring 2 can be assembled and fitted into the outer race 4 very easily.

As detailed above, in the one-way clutch of the present invention, it is not necessary to individually install metal springs on the retainer by crimping. The metal spring of the one-way clutch of the present invention can be mounted on the retainer by simple operation, whereby assembly can be carried out very easily. Furthermore, since the spring is made of metal, it is superior in durability and reliability, and can attain long service life. Moreover, crimping work and complicated metal molds are not required, thereby reducing production cost.

What is claimed is:

1. A one-way clutch comprising:

a retainer provided with one ring-shaped portion having an outer circumferential surface to be fitted into the inner circumferential surface of an outer race, an other ring-shaped portion having an outer diameter smaller than that of said one ring-shaped portion and having convex portions formed at constant intervals in the circumferential direction on the outer circumferential surface thereof, bar portions for connecting said two ring-shaped portions, and pockets for each accommodating a roller between every two of said bar portions, and a metal spring provided with a flange portion having concave portions on the inner circumferential side thereof to be fitted over said convex portions formed on the outer circumferential surface of said other ring-shaped portion, elastic leaf portions formed at constant intervals in the circumferential direction on the outer circumferential side of said flange portion, extended in the axial direction and positioned in said pockets of said retainer, and convex portions formed at constant intervals in the circumferential direction on the outer circumferential side of said flange portion, extended in the axial direction, and having inner circumferential surfaces to be fitted over the outer circumferential surfaces of said bar portions.

* * * * *